(No Model.)  6 Sheets—Sheet 4.

P. W. LEFFLER.
MOTOR CAR TRUCK.

No. 573,823. Patented Dec. 22, 1896.

Witnesses
C. F. Kilgore
E. F. Elmore

Inventor
Paul W. Leffler
By his Attorney
Jas. F. Williamson (No Model.) 6 Sheets—Sheet 5.

P. W. LEFFLER.
MOTOR CAR TRUCK.

No. 573,823. Patented Dec. 22, 1896.

Witnesses
C. F. Kilgore
E. F. Elmore

Inventor.
Paul W. Leffler.
By his Attorney.
Jas. F. Williamson

UNITED STATES PATENT OFFICE.

PAUL W. LEFFLER, OF CHICAGO, ILLINOIS, ASSIGNOR TO THE LEFFLER ELECTRO MAGNETIC RAILWAY COMPANY, OF SAME PLACE.

MOTOR-CAR TRUCK.

SPECIFICATION forming part of Letters Patent No. 573,823, dated December 22, 1896.

Application filed March 21, 1896. Serial No. 584,309. (No model.)

*To all whom it may concern:*

Be it known that I, PAUL W. LEFFLER, a citizen of the United States, residing at Chicago, in the county of Cook and State of Illinois, have invented certain new and useful Improvements in Motor-Car Trucks; and I do hereby declare the following to be a full, clear, and exact description of the invention, such as will enable others skilled in the art to which it appertains to make and use the same.

My invention relates to electric motors and motor-trucks, and was especially designed for use in connection with that system of electric propulsion for railways and other traveling bodies which is disclosed in certain prior patents and pending applications of mine, identified as follows: United States Patent No. 514,561, of date February 13, 1894; United States Patent No. 514,718, of date February 13, 1894; application, Serial No. 558,992, filed August 12, 1895; application, Serial No. 558,993, filed August 12, 1895; application, Serial No. 559,702, filed August 19, 1895; application, Serial No. 563,716, filed September 26, 1895; application, Serial No. 564,981, filed October 8, 1895, and application, Serial No. 582,760, filed March 11, 1896. Some of the features of the invention are, however, capable of general application to all kinds of car-trucks wherein six or more wheels are employed and a flexible construction is desired.

The special object had in view is to provide a truck of six or more wheels which shall be sufficiently flexible for ready adaptation to curves and irregularities of the road-bed and at the same time be sufficiently strong and rigid for the work required. In the system of propulsion identified in the above-noted patents and applications field-magnets are located in the line of travel and a non-rotating armature is carried on the car. For many classes of work a large motor-truck is required with a non-rotating armature of considerable length supported underneath the truck-axles at a point near the "electroduct" or electric conduit in the road-bed, wherein are placed the magnets of the field.

My invention was especially designed to meet the requirements above noted.

To this end the invention consists of the novel devices and combinations of devices hereinafter described, and defined in the claims.

The invention is illustrated in the accompanying drawings, wherein, like notations referring to like parts throughout the several views—

In respect to the electric devices shown in the drawings it will only be necessary to briefly distinguish such parts as are needed to render clear the purpose of the improved truck.

Figure 2:
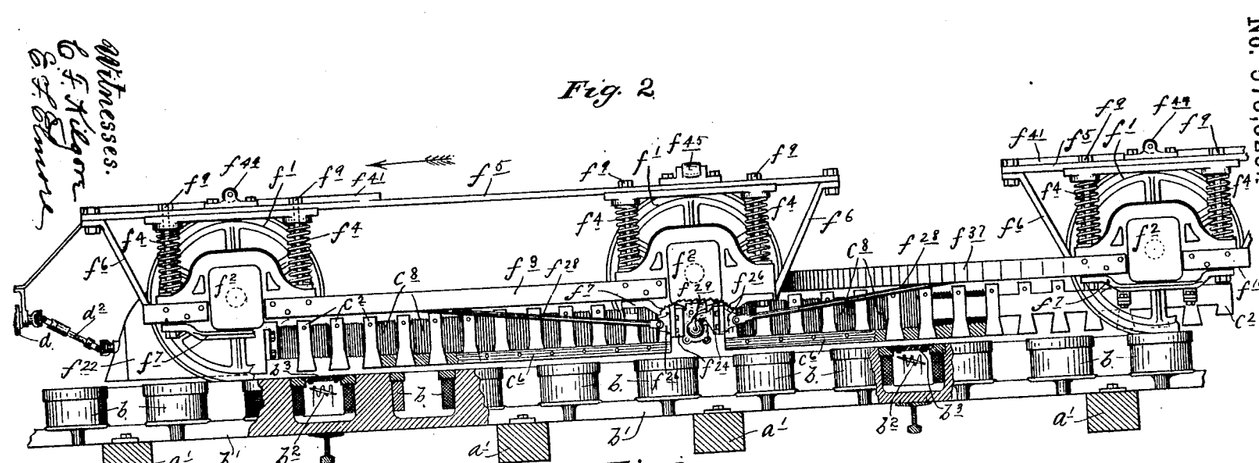
Fig. 2 is a side elevation of the same and some of the field-magnets with some parts broken away and some shown in section.
Figure 3:
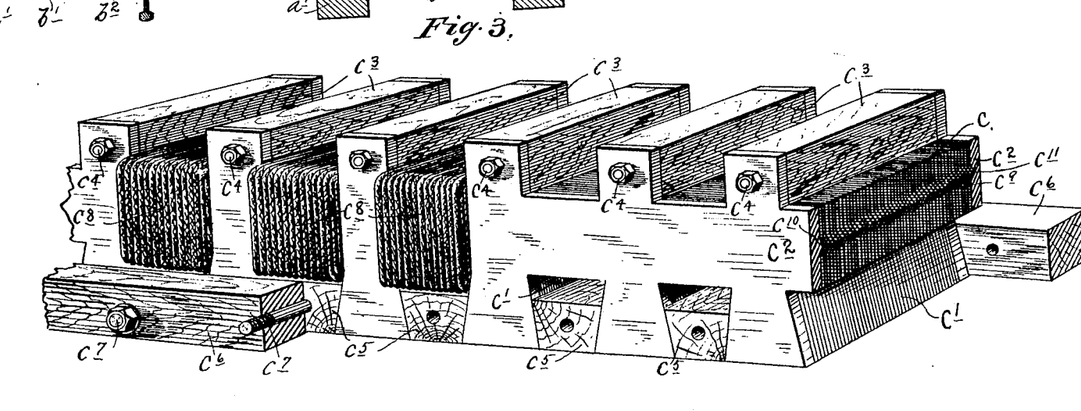
Fig. 3 is a detail in perspective, on a large scale, showing a part of the armature removed from the car.
Figure 4:
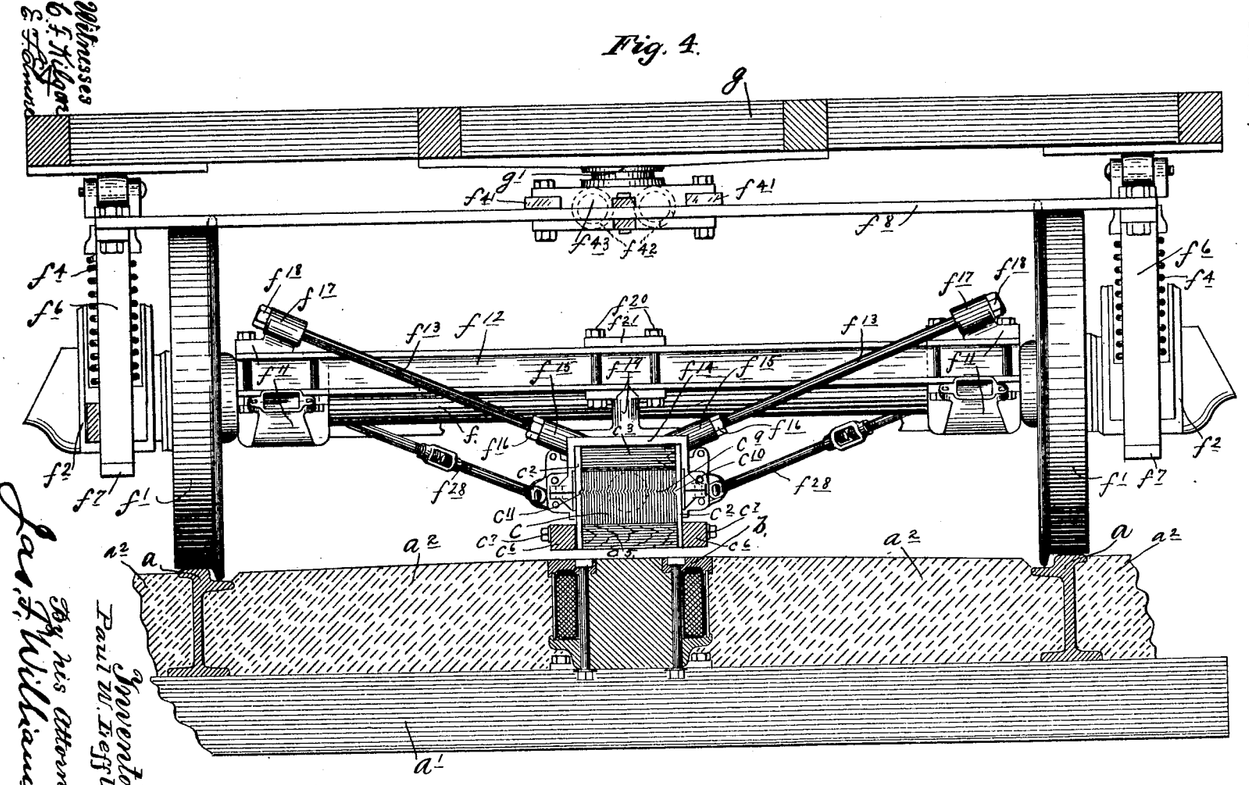
Fig. 4 is a right end elevation of the car-truck, as shown in Fig. 1, with a part of the road-bed shown in section.
Figure 10:
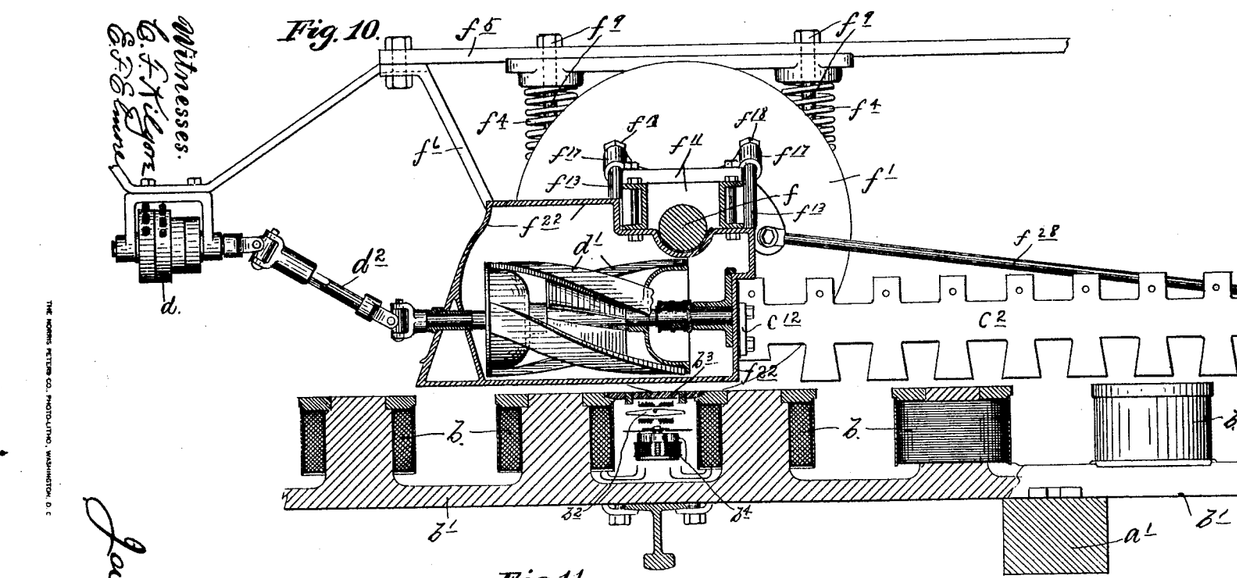
Fig. 10 is a view in longitudinal vertical section through a part of the car-truck and through some of the field-magnets in the road-bed.
Figure 11:
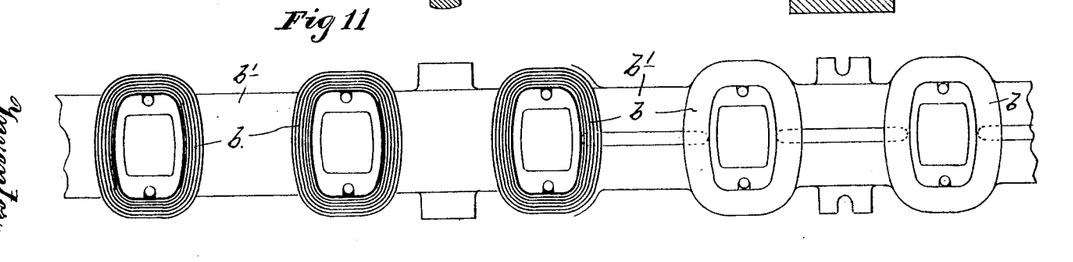
Fig. 11 is a plan view of some of the field-magnets.

The track-rails $a$, the ties $a'$, and the pavement $a^2$ for a surface road, as shown in Fig. 4, may be of the customary or any suitable construction. The field-magnets $b$ are spaced apart from each other in the line of travel, with their cores rising from a common base-bar $b'$, which is bolted or otherwise secured to the cross-ties $a'$. These field-magnets $b$ are supplied with current from a dynamo or other source at a central station and are so wound that adjacent members thereof are of opposite polarity. The circuit connections for the said field-magnets are so constructed and applied as to constitute out of said field-magnets a successive series of field-sections, which are normally cut out of the supply-circuit, but which are adapted to be cut into the supply-circuit under the control of the car. The said field-sections are cut in and out by means of magnetic switch-boxes having magnetic controllers subject to the action of the armature on the car. The circuit connections for said field-magnets and the construction of said switch-boxes are not shown, but the positions of the switch-boxes are indicated by the magnetic controllers $b^2$ and the switch-box covers $b^3$, as shown in Fig. 2, and by the same parts, together with some of the switch-box magnets and connections $b^4$, as shown in Fig. 10.

With the field-magnets $b$ in the line of travel coöperates a non-rotating armature carried on the car. This armature, according to my present invention, is constructed in two sections, which it will be convenient to distinguish as the "front" and "rear" sections, respectively, with regard to their relative positions on the truck. So far as the core and coils or windings of these armature-sections are concerned the same are identical with the construction shown in some of my prior cases above identified. The core of each armature-section is laminated or made up of a series of plates having body portions and projecting portions, which plates thus formed, when put together, constitute a core having a continuous body $c$ and downwardly-projecting pole-pieces $c'$. The said core-plates $c\ c'$ are clamped between a pair of iron side plates $c^2$, having a continuous body portion and downwardly-extending projections, corresponding to the form of the core-plates, and also provided with upwardly-extending projections, between which are placed wooden spacing-blocks $c^3$. Nutted draw-bolts $c^4$ connect the upward extensions of the side plates $c^2$ through the spacing-blocks $c^3$. Between the downward projections of the core-plates $c\ c'$ and the side plates $c^2$ are placed filling strips or blocks $c^5$, of wood or similar material. A pair of wooden side bars $c^6$ are clamped against the lower margins of the side plates $c^2$ and the ends of the filling-blocks $c^5$ by nutted cross rods or bolts $c^7$, working through the parts $c^5$ and $c^6$. The coils $c^8$ of the armature are wound about the body portion $c$ of the core between the polar projections $c'$. As shown, the said coils $c^8$ also embrace the body portions of the side plate $c^2$ and are separated above the body of the core by the transverse spacing-blocks $c^3$, before noted. The winding of the armature is of such a character and so connected up as to form out of the coils $c^8$ several series or sets provided with independent wires to brushes coöperating with the segments of a suitable commutator (shown at $d$ in Fig. 10) for changing the polarities of the armature pole-pieces $c'$ in the proper order for the desired coöperation with the field-magnets $b$ to propel the car. The said commutator $d$ is driven, according to the speed of the car, by a magnetic rotary pole-changer $d'$, subject to the field-magnets $b$, as shown in Fig. 10, and coupled with the commutator through suitable connections $d^2$. The current for the armature on the car is supplied by a suitable battery carried by the car or from any other desired source through suitable connections. (Not shown.)

As a detail of construction it may be noted that all the core-plates $c\ c'$ are pressed out on their longitudinal centers to form a projecting rib on one side and a groove on the other side of V shape in cross-section, as shown at $c^9$ in Fig. 4. The side plates $c^2$ are of the proper corresponding construction, one thereof being provided with a V-shaped rib $c^{10}$ and the other with a V-shaped groove $c^{11}$. Hence the core-plates $c\ c'$ may be made to engage with each other and be engaged by the side plates $c^2$, with the said V-shaped ribs and grooves interlocking with each other. This feature of construction renders it easy to accurately center or aline all the said plates in proper position relative to each other and hold the same from displacement.

Turning now to the truck and truck-frame proper, as distinguished from the armature-sections, the several axles are marked $f$ and the wheels $f'$. All the truck-axles are mounted in the usual or any suitable way in proper boxes $f^2$. The forward pair of truck-axles $f$ with their boxes $f^2$ carry rigid side bars or frames $f^3$, from which is supported by suitable springs $f^4$ a skeleton frame $f^5\ f^6\ f^7\ f^8$ for supporting the car-body. The springs $f^4$ encircle suitable combined tie and guide bolts $f^9$, connecting the parts $f^5$ and $f^7$, through the side bars $f^3$ in the usual way. Otherwise, and more briefly stated, the two forward trucks are mounted as an ordinary rigid four-wheeled truck.

The rear truck-axle $f$ and its boxes $f^2$ carry side bars or frames $f^{10}$, from which, in a similar way, is supported a corresponding short skeleton frame, the parts of which are numbered with the same letters as the corresponding parts on the forward truck for supporting the rear end of the car-body, to wit: $f^5$ to $f^9$, inclusive. The springs are also marked $f^4$ on the rear truck.

On the several truck-axles $f$ are mounted hanger-frames composed of boxes $f^{11}$, directly inward of the wheel-hubs, and transoms or transverse bars $f^{12}$, connecting the said pairs of boxes and embracing the axle. All of these hanger-frames $f^{11}\ f^{12}$ are provided with hanger-rods or arms which extend downward and inward toward the center of the truck to points below the axles and are attached directly or indirectly to the armature-sections for coöperation in the support of the armature from the hanger-frames on the truck-axles. The said hanger-rods $f^{13}$ as constructed for use in connection with the hanger-frames on the front and rear axles are made in sections. The rear pair of said hanger-rods $f^{13}$ connect with the rear end of the rear armature-section by means of a cap or cup-like casting $f^{14}$, which embraces the armature and is rigidly bolted thereto. The said hanger-rods $f^{13}$ for the rear truck-axle connect with the said casting $f^{14}$ in such a way as to be adjustable, as, for example, by means of nipples $f^{15}$ on the casting, having screw-threaded engagement with the lower ends of the hanger-arms, and the hanger-arms are provided with jam-nuts $f^{16}$ for locking the same wherever set. At their upper ends the said hanger-rods $f^{13}$ work through perforated lugs $f^{17}$ on the boxes $f^{11}$ and are provided with nuts $f^{18}$ outward of the lugs for tightening the same in position. The said casting $f^{14}$ at the rear section of the armature is also provided with an upwardly-projecting yoke-like casting $f^{19}$, the heads of which bear against the lower faces of the transoms $f^{12}$ and are made fast to the transoms by nutted bolts $f^{20}$, passing through the same and a top cross-tie plate $f^{21}$. By this construction it will be seen that the rear armature-section is rigidly supported and braced, with a trussing action, from the hanger-frame $f^{11} f^{12}$ on the rear axle. The hanger-arms $f^{13}$, coöperating with the hanger-frame $f^{11} f^{12}$ on the front axle, are applied in the same way to the boxes $f^{11}$ at their upper or outer ends; but their lower or inner ends connect to a hollow casting $f^{22}$, (shown in Fig. 10,) which serves as a housing for the rotary pole-changer $d'$ and as a means for supporting the forward end of the front armature-section. The lower ends of the said hanger-rods $f^{13}$ on the forward axle are attached to the said casting $f^{22}$ by screw-threaded nipples and jam-nuts in substantially the same way as the rear hanger-rods $f^{13}$ are attached to the casting $f^{14}$. The side plates of the front section of the armature are shown in Fig. 10 as provided with side flanges $c^{12}$, which are bolted to the rear end of the said casting $f^{22}$.

Figure 1:
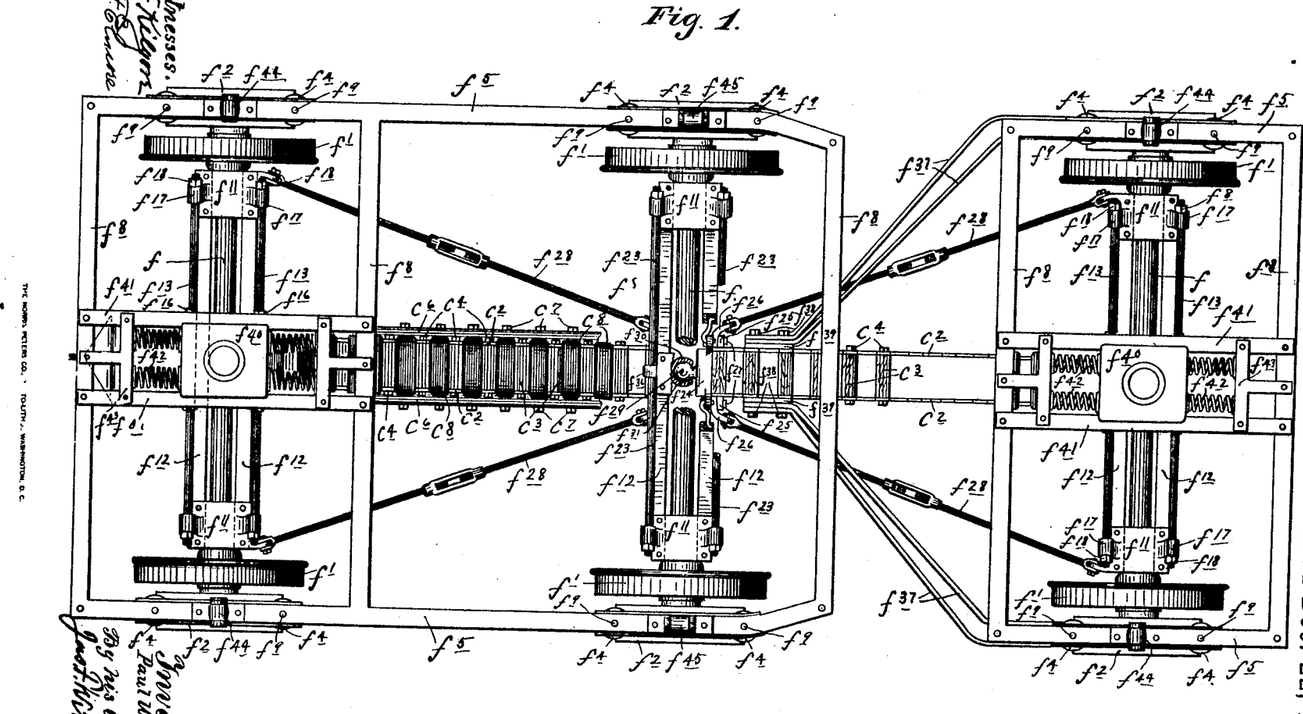
Figure 1 is a plan view of my improved truck with some parts broken away and others removed.
Figure 5:
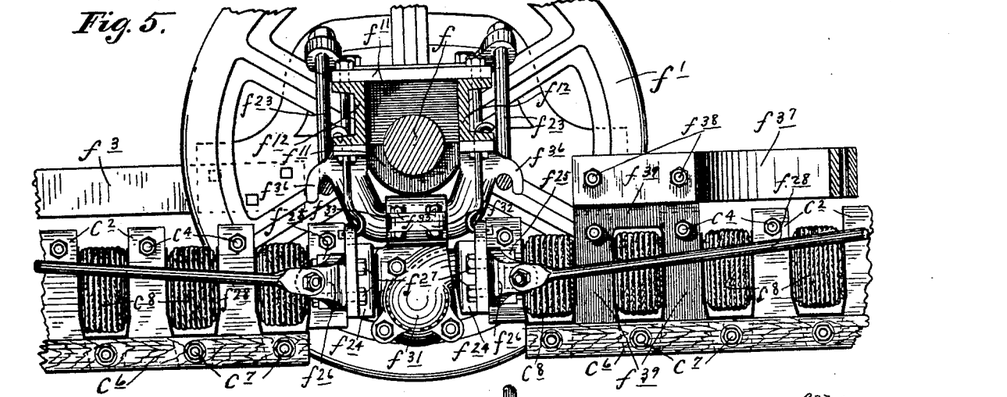
Fig. 5 is a detail, partly in elevation and partly in section and with some portions broken away, showing the joint connecting the truck-sections.
Figure 6:
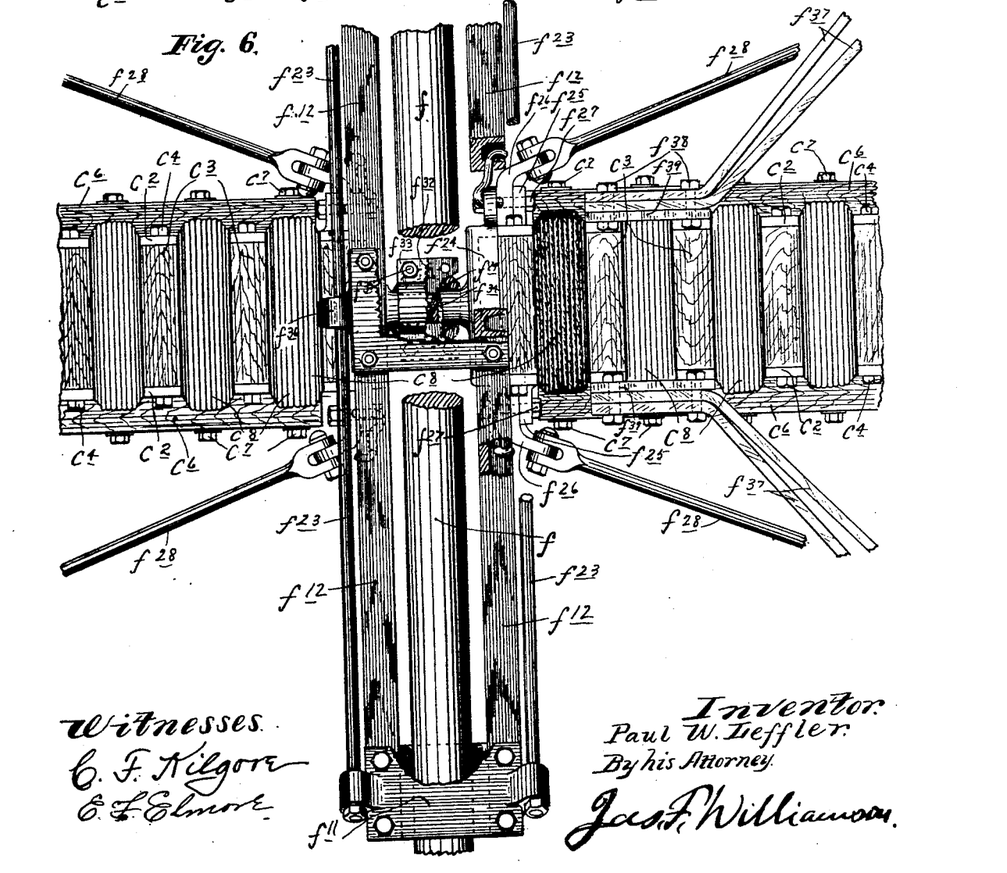
Fig. 6 is a plan view of some of the parts shown in Fig. 5 and some portions broken away.
Figure 7:
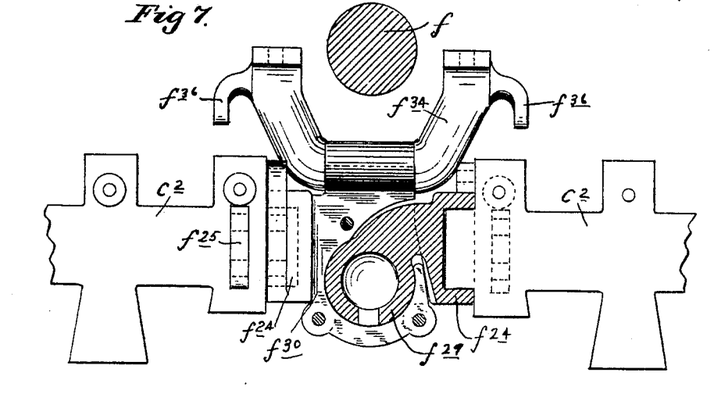
Figs. 7, 8, and 9 are detail views of the joint connecting the two trucks and armature-sections said Fig. 7 being a view partly in elevation and partly in longitudinal vertical section, said Fig. 8 being a view partly in plan and partly in horizontal section with some parts broken away, and said Fig. 9 being a view in cross-section on the line $x^9$ $x^9$ of Fig. 8.
Figure 8:
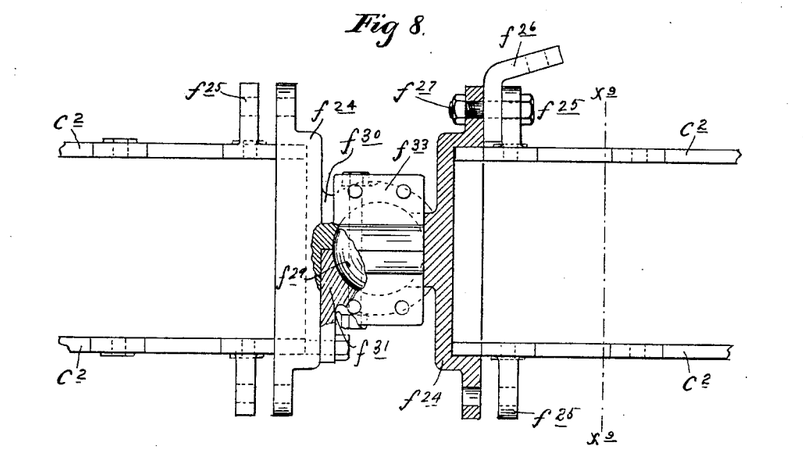
Figure 9:
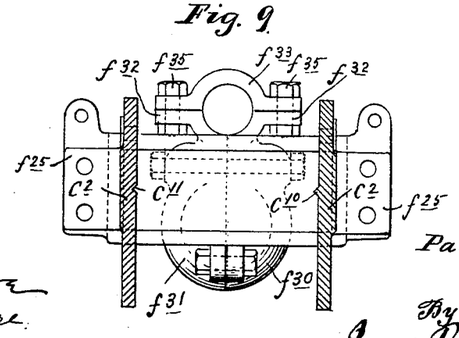

The central hanger-arms $f^{23}$ are not made in sections, but are entire throughout and are of a length to reach from one of the boxes $f^{11}$ to the other on the central hanger-frame, and are also formed with a central dip for bringing the central parts of the same to points below the level of the central truck-axle, as best shown in Fig. 5. The facing or coupling ends of the two armature-sections are fitted with end cap-castings $f^{24}$, which are adapted to be bolted to lateral lugs $f^{25}$, projecting from the side plates $c^2$ of the armature-sections. Angular lugs $f^{26}$ are embraced between the perforated ears of the castings $f^{24}$ and the lugs $f^{25}$, and all the said parts are secured together by common nutted bolts $f^{27}$. The angular lugs $f^{26}$ are engaged by the central or inner ends of turnbuckle brace-rods $f^{28}$, two of which extend forward and have their outer ends made fast to the hanger-boxes $f^{11}$ of the front axle, and two of which extend rearward and have their outer or upper ends made fast to the hanger-boxes $f^{11}$ on the rear axle. The two castings $f^{24}$ are provided with the coöperating members of a ball-and-socket joint, which serves to couple together the two armature-sections and the two rigid truck-sections. The ball portion $f^{29}$ of this joint is in the form of a hook-like head projecting forward from the cap-casting $f^{24}$, applied to the rear armature-section. The socket member of the said joint is made up of a fixed section $f^{30}$, cast integral with and projecting from the cap-casting $f^{24}$, applied to the forward armature-section, and of a removable section $f^{31}$, adapted to be bolted fast to the fixed section $f^{30}$ after the ball member $f^{29}$ has been placed in position. The two sections $f^{30}$ and $f^{31}$ of the socket member are provided, at their upper ends, with quarter-sections $f^{32}$ of a box-like yoke, adapted to embrace a hanger-yoke $f^{34}$. The cap or upper half $f^{33}$ of said box $f^{32} f^{33}$ is bolted fast to the parts $f^{32}$ after the yoke $f^{34}$ is in position. The yoke $f^{34}$ has its upper ends made fast by nutted bolts $f^{35}$ to the transoms $f^{12}$ of the central hanger-frame. The yoke $f^{34}$ is provided with hook-lugs $f^{36}$, which are engaged by the hanger-rods $f^{23}$. The side frames or bars $f^{10}$ of the rear truck-frame have attached to their forward ends pairs of brace-rods $f^{37}$, which extend inward and forward and are made fast by bolts $f^{38}$ to lug-plates $f^{39}$, bolted fast to the rear armature-section, near its forward end, as best shown in Figs. 1, 5, and 6. The frames the parts of which are marked $f^5$ to $f^9$, inclusive, are provided with center plates $f^{40}$, mounted between guides $f^{41}$, fixed to the parts $f^8$ for longitudinal movement therein against springs $f^{42}$, reacting between the said center plates and suitable back-stops or base-plates $f^{43}$, fixed to the guides $f^{41}$. The top bars $f^5$ of the car-body-supporting frame are provided with rollers $f^{44}$ and $f^{45}$. The rollers $f^{44}$ are located at the forward end of the front frame and centrally of the rear frame and are arranged crosswise of the truck for taking the backward and forward motion of the car-body $g$, (shown in Fig. 4,) while the rollers $f^{45}$ are located near the rear end of the forward frame and are arranged lengthwise of the truck for taking the side motion of the car-body. A small portion of the car-body $g$, together with its rear-end center plate $g'$, is shown in Fig. 4 of the drawings.

The different parts of my improved truck have now been specified. From the said description it must be obvious that a six-wheeled truck is obtained composed of two sections, consisting of a rigid four-wheeled forward truck and a rigid two-wheeled rear truck, which are connected or coupled together by a universal joint for permitting angular motion of the two rigid trucks in respect to each other. It is also obvious that the two rigid truck-sections carry each one section of a rigid non-rotating armature composed of two sections, which are also coupled together by the same universal joint, which serves to unite the two truck-sections. By inspection of the drawings it will also be seen that this universal-joint coupling is located in a vertical line through the center of the entire or six-wheeled truck. Otherwise stated, it will be found that if diagonal lines be drawn from the outer ends of the forward-truck axle to the outer ends of the rear-truck axle when the two truck-sections or all the wheels of the trucks on corresponding sides are in line with each other the said diagonal lines will intersect or cross in a vertical line through the universal-joint coupling. The front and rear trucks, therefore, stand related to the central truck as two similar triangles having a common apex at the universal-joint coupling. Hence the rear rigid truck and its armature-section will coöperate with the four-wheeled or forward rigid truck-frame as nearly as possible on lines coincident with the longitudinal median line of the entire truck. Otherwise stated, the pulling and pushing strains of the two truck-sections in respect to each other under all their angular adjustments will depart as little as possible from the central line of the rigid four-wheeled forward truck produced. This is highly important for enabling the entire or six-wheeled truck to adapt itself to curves with the minimum of angular displacement of the armature in respect to the field-magnets or electric conduit in the road-bed.

From the description of the parts it is also obvious that the armature-sections are supported from the truck-axles in such a way as to be absolutely rigid with the respective truck-frames and as to be trussed or braced with a trussing action in every direction. A flexible six-wheeled truck is therefore obtained which is sufficiently strong to stand the rough usage required in the service. It will also be noted that in virtue of the spring-cushioned mounting of the center plates $f^{40}$ for supporting the car-body, as described, the car-body will be spring-cushioned longitudinally in respect to the movements of the truck. This is an important feature for avoiding violent shocks and jars to the car-body and passengers in starting and stopping the car.

One or two further details of the construction should have been noted. Four short hooks $f^{46}$ connect the four corners of the castings $f^{24}$, applied to the coupling ends of the armature-sections with the transoms $f^{12}$ of the central hanger-frame, as best shown in Figs. 5 and 6. These hooks $f^{46}$ help to carry part of the weight of the armature-sections and have sufficient motion in the seats or lugs engaged thereby on the transoms and castings, so as not to interfere with the necessary lateral or angular motion of the rear-truck frame. These hooks $f^{46}$ also serve to prevent any sidewise rocking motion of the armature-sections at their coupling ends.

In Figs. 2 and 10 I-beams $b^5$ are shown as applied transversely to the under surface of the base-bar $b'$ of the field-magnet cores by means of hook-flanges $b^6$ and screw-bolts $b^7$. The purpose of these bars $b^5$ is to bind the base-bar of the field-magnet core to the rails of the track, so as to hold the same together in one common horizontal plane. Inasmuch as the rails of the track and the base-bar of the field-magnet core are thus bound together and all supported by the common cross-ties, they must always move up and down together in case of settling of the ties or decay of the same.

What I claim, and desire to secure by Letters Patent of the United States, is as follows:

1. The combination with a sectional truck, of a sectional armature, carried, one section on each of said truck-sections, and a common universal joint or joints applied to couple together said truck-sections and said armature-sections.

2. A six-wheeled truck having a non-rotating armature, with the truck and the armature each constructed in two rigid sections, coupled together by a common universal joint located at the center of the six-wheeled truck, substantially as described.

3. The combination with a car-truck, of a non-rotating armature, hanger-frames, boxed on the truck-axles and hanger-arms supporting the said armature from the said hanger-frames.

4. The combination with a car-truck and a non-rotating armature, of hanger-frames on the truck-axles, consisting of end boxes on the axles directly inward of the wheels, and transoms connecting the said boxes and embracing the axle, and hanger-arms having their upper ends connected to the said boxes, and their lower ends connected directly or indirectly, to the said armature, substantially as described.

5. The combination with the sectional six-wheeled truck and the sectional armature, coupled together by a common universal joint, of the hanger-frames mounted on the axles, and the hanger-arms connecting the said hanger-frames with the armature-sections, all of which hanger-arms are provided with means for adjusting the same relative to the hanger-frames and the armature-section, substantially as described.

6. The combination with the six-wheeled truck constructed in two rigid sections, comprising, respectively, the four-wheeled forward section and the two-wheeled rear section, of the two corresponding armature-sections, carried by said respective truck-sections, the ball-and-socket joint applied to couple together said armature-sections and said truck-sections, the hanger-frames boxed on the truck-axles, the hanger-arms connecting the armature-sections with said hanger-frames, and the longitudinal turnbuckle brace-rods $f^{28}$ applied to brace the hanger-frames and the armature-sections, lengthwise thereof, substantially as described.

7. The combination with the sectional truck and the sectional armature, of the ball-and-socket joint coupling together the armature and the truck sections, the hanger-frame mounted on the central truck-axle, the hanger-arms $f^{23}$, as described, the yoke $f^{34}$ made fast to the socket member of the ball-and-socket joint and to the transoms of said hanger-frame, and provided with hooks $f^{36}$, engaging over the depressed or central portions of said hanger-arms, substantially as described.

8. The combination with the sectional truck and the sectional armature, of the ball-and-socket joint coupling together said truck-sections and said armature-section, the hanger-frame mounted on the truck-axles, the rear hanger-arms $f^{13}$ connecting the boxes $f^{11}$ of the rear hanger-frame to the rear end of the rear armature-section, by means of the casting $f^{14}$, the forward hanger-arms $f^{13}$ connecting the boxes $f^{11}$ of the forward hanger-frame with the forward end of the front armature-section, by means of the casting $f^{22}$, the central hanger-arms $f^{23}$, the yoke $f^{34}$ engaging the said arm and made fast to the socket member of the ball-and-socket joint and to the transoms of the central hanger-frame, the hooks $f^{46}$ connecting the corners of the casting $f^{24}$ with the said transoms $f^{12}$ of the central hanger, and the diagonal brace-rods $f^{28}$, made fast, at their inner ends, to the coupling ends of the armature-sections, and, at their outer ends, to the boxes of the front and rear hanger-frames, substantially as described.

9. The combination with the four-wheeled forward truck-section and the two-wheeled rear truck-section, of the armature-sections carried by said truck-sections, the universal joint coupling together said truck and armature sections, the rigid frame for the four-wheeled section, and the rigid frame for the two-wheeled section, composed of the side bars $f^{10}$ and the bars $f^{37}$, extending forward from the side bars $f^{10}$ and inward to a junction with the rear armature-section and made fast thereto, near its forward end, substantially as described.

In testimony whereof I affix my signature in presence of two witnesses.

PAUL W. LEFFLER.

Witnesses:
RALPH R. BRADLEY,
ADAMS A. GOODRICH.